US010878621B2

(12) United States Patent
Zhou et al.

(10) Patent No.: US 10,878,621 B2
(45) Date of Patent: Dec. 29, 2020

(54) METHOD AND APPARATUS FOR CREATING MAP AND POSITIONING MOVING ENTITY

(71) Applicant: Baidu Online Network Technology (Beijing) Co., Ltd., Beijing (CN)

(72) Inventors: Wang Zhou, Beijing (CN); Miao Yan, Beijing (CN); Yifei Zhan, Beijing (CN); Xiong Duan, Beijing (CN); Changjie Ma, Beijing (CN); Xianpeng Lang, Beijing (CN); Yonggang Jin, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/233,834

(22) Filed: Dec. 27, 2018

(65) Prior Publication Data

US 2019/0206124 A1    Jul. 4, 2019

(30) Foreign Application Priority Data

Dec. 29, 2017    (CN) .......................... 2017 1 1479272

(51) Int. Cl.
*G06T 17/05* (2011.01)
*G01C 21/32* (2006.01)
(Continued)

(52) U.S. Cl.
CPC ............ *G06T 17/05* (2013.01); *G01C 21/005* (2013.01); *G01C 21/20* (2013.01); *G01C 21/32* (2013.01);
(Continued)

(58) Field of Classification Search
None
See application file for complete search history.

(56) References Cited

U.S. PATENT DOCUMENTS 9,686,451 B2 *   6/2017   Pillai ............... G06K 9/00697
10,169,678 B1 *  1/2019   Sachdeva ............ G06F 3/011
(Continued)

FOREIGN PATENT DOCUMENTS

CN    102460074 A    5/2012
CN    104573733 A    4/2015
(Continued)

OTHER PUBLICATIONS

Oliva, Aude, and Antonio Torralba. "Modeling the shape of the scene: A holistic representation of the spatial envelope." International journal of computer vision 42.3 (2001): 145-175. (Year: 2001).*

*Primary Examiner* — Ryan M Gray
(74) *Attorney, Agent, or Firm* — Seed IP Law Group LLP

(57) ABSTRACT

Exemplary embodiments of the present disclosure provide a method, apparatus and computer readable storage medium for creating a map and positioning a moving entity. A method for creating a map includes acquiring an image acquired when an acquisition entity is moving and location data and point cloud data associated with the image, the location data indicating a location where the acquisition entity is located when the image is acquired, the point cloud data indicating three-dimensional information of the image. The method further includes generating a first element in a global feature layer of the map based on the image and the location data. The method further includes generating a second element in a local feature layer of the map based on the image and the point cloud data, the first element corresponding to the second element.

16 Claims, 5 Drawing Sheets

(51) Int. Cl.
    *G01C 21/20*     (2006.01)
    *G01C 21/00*     (2006.01)
    *G06K 9/00*      (2006.01)
    *G05D 1/02*      (2020.01)
(52) U.S. Cl.
    CPC ....... *G06K 9/00791* (2013.01); *G05D 1/0231* (2013.01)

(56) References Cited

U.S. PATENT DOCUMENTS

| | | | |
|---|---|---|---|
| 10,169,680 B1* | 1/2019 | Sachdeva | G06T 15/30 |
| 2009/0026974 A1 | 1/2009 | Miyamoto et al. | |
| 2010/0034426 A1* | 2/2010 | Takiguchi | G01C 21/3602 |
| | | | 382/106 |
| 2010/0305854 A1* | 12/2010 | Kammel | G01C 21/005 |
| | | | 701/469 |
| 2016/0358338 A1* | 12/2016 | Tsunoda | G06K 9/4671 |
| 2017/0371348 A1* | 12/2017 | Mou | G01S 17/931 |
| 2018/0232947 A1* | 8/2018 | Nehmadi | G06T 3/4007 |
| 2018/0275277 A1* | 9/2018 | Li | G01S 17/89 |
| 2019/0025071 A1 | 1/2019 | Fukui | |
| 2019/0096086 A1* | 3/2019 | Xu | G06K 9/00208 |

FOREIGN PATENT DOCUMENTS

| | | |
|---|---|---|
| CN | 106503248 A | 3/2017 |
| EP | 2833322 A1 | 2/2015 |

\* cited by examiner

METHOD AND APPARATUS FOR CREATING MAP AND POSITIONING MOVING ENTITY

CROSS-REFERENCE TO RELATED APPLICATIONS

This application claims priority to Chinese Patent Application No. 201711479272.4, filed on Dec. 29, 2017, titled "Method and Apparatus for Creating Map and Positioning Moving Entity," which is hereby incorporated by reference in its entirety.

TECHNICAL FIELD

Embodiments of the present disclosure mainly relate to the field of positioning, and more specifically to a method and apparatus for creating a map and positioning a moving entity based on the map.

BACKGROUND

In one's daily life, it is often necessary to position various moving entities (e.g., a moving person, a travelling vehicle, etc.) in order to acquire the locations of the moving entities, thereby providing location-based services, such as navigation, and providing traffic condition information. The services with higher positioning accuracies may better meet the needs of the users.

On the other hand, with the development of artificial intelligence, the autonomous driving technology has attracted people's attention, and more and more research institutions and business companies begin to invest in and deploy the autonomous driving technology. An essential technology in the field of the autonomous driving is high accuracy positioning. For achieving mass production of autonomous driving vehicles, a bottleneck is how to acquire high accuracy positioning results at low costs.

SUMMARY

According to exemplary embodiments of the present disclosure, a map creation method and a moving entity positioning solution are provided.

In a first aspect, the present disclosure provides a method for creating a map. The method includes acquiring an image acquired when an acquisition entity is moving and location data and point cloud data associated with the image. The location data indicates a location where the acquisition entity is located when the image is acquired, and the point cloud data indicates three-dimensional information of the image. The method further includes generating a first element in a global feature layer of the map based on the image and the location data. The method further includes generating a second element in a local feature layer of the map based on the image and the point cloud data, the first element corresponding to the second element.

In a second aspect, the present disclosure provides a method for positioning a moving entity. The method includes acquiring an image acquired when the moving entity is moving. The method further includes acquiring location data regarding a location where the moving entity is located when the image is acquired. The method further includes positioning the moving entity based on the image, the location data, and the map according to the first aspect of the present disclosure.

In a third aspect, the present disclosure provides an apparatus for creating a map. The apparatus includes: an acquisition module, configured to acquire an image acquired when an acquisition entity is moving and location data and point cloud data associated with the image, the location data indicating a location where the acquisition entity is located when the image is acquired, and the point cloud data indicating three-dimensional information of the image; a global feature layer generation module, configured to generate a first element in a global feature layer of the map based on the image and the location data; and a local feature layer generation module, configured to generate a second element in a local feature layer of the map based on the image and the point cloud data, the first element corresponding to the second element.

In a fourth aspect, the present disclosure provides an apparatus for positioning a moving entity. The apparatus includes: an image acquisition module, configured to acquire an image acquired during traveling of the moving entity; a location acquisition module, configured to acquire location data of the moving entity when the image is acquired; and a positioning module, configured to determine positioning of the moving entity based on the image, the location data, and the map according to the first aspect of the present disclosure.

In a fifth aspect, the present disclosure provides an apparatus, including one or more processors; and a storage apparatus, for storing one or more programs, the one or more programs, when executed by the one or more processors, cause the one or more processors to implement the method according to the first aspect of the present disclosure.

In a sixth aspect, the present disclosure provides an apparatus, including one or more processors; and a storage apparatus, for storing one or more programs, the one or more programs, when executed by the one or more processors, cause the one or more processors to implement the method according to the second aspect of the present disclosure.

In a seventh aspect, the present disclosure provides a computer readable storage medium, storing a computer program thereon, the computer program, when executed by a processor, implements the method according to the first aspect of the present disclosure.

In an eighth aspect, the present disclosure provides a computer readable storage medium, storing a computer program thereon, the computer program, when executed by a processor, implements the method according to the second aspect of the present disclosure.

It should be understood that the content of the Summary is not intended to limit key or important features of the embodiments of the present disclosure, or the scope of the present disclosure. Other features of the present disclosure will be readily understood by the following description.

BRIEF DESCRIPTION OF THE DRAWINGS

The above and other features, advantages and aspects of embodiments of the present disclosure will become more apparent, in combination with the accompanying drawings and with reference to the following detailed description. In the accompanying drawings, the identical or similar reference numbers refer to the identical or similar elements, in which.

DETAILED DESCRIPTION OF EMBODIMENTS

Figure 1:
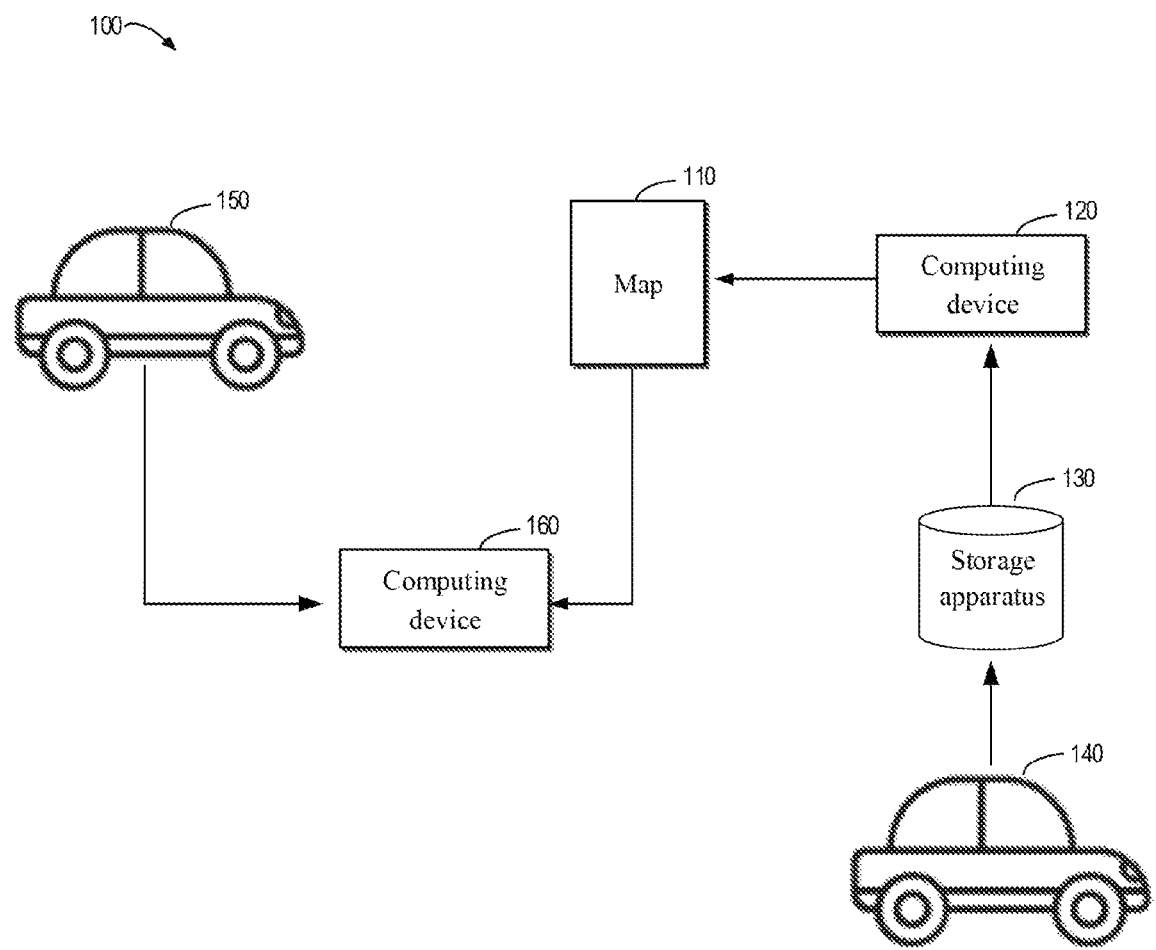
FIG. 1 illustrates a schematic diagram of an exemplary environment in which various embodiments of the present disclosure may be implemented.

Embodiments of the present disclosure will be described in more detail below with reference to the accompanying drawings. Although certain embodiments of the present disclosure are shown in the accompanying drawings, it should be understood that the present disclosure may be implemented in a variety of forms, and should not be construed as being limited to the embodiments set forth herein. The embodiments are provided to provide a more thorough and complete understanding of the present disclosure. It should be understood that the accompanying drawings and the embodiments of the present disclosure are to be considered as illustrative only and are not intended to limit the scope of the present disclosure.

In the description of the embodiments of the present disclosure, the term "include" and variants thereof should be understood as open-ended, i.e., "including but not limited to." The term "based on" should be understood as "at least partially based on." The term "one embodiment" or "the embodiment" should be understood as "at least one embodiment." The terms "first," "second," and the like may refer to different or identical objects. Other explicit and implicit definitions may also be included below.

As mentioned above, in order to provide users with better location-based services, precision positioning is required. Especially in the field of autonomous driving, it is more important to achieve precise automatic positioning of the vehicle at a lower cost.

The conventional positioning solutions may be generally classified into positioning methods based on laser point cloud and image-based positioning methods. The advantages of the positioning methods based on laser point cloud are that the positioning precision is high and the technology is relatively mature, but the disadvantages thereof are also obvious, that is, the cost is too high to achieve mass production. The image-based positioning methods have low costs and may easily be used in mass production, but, the method precision is not high enough to meet the requirements on autonomous driving.

According to an embodiment of the present disclosure, a map-based moving entity positioning solution is provided. The solution makes full use of the advantages of high positioning accuracy of the laser radar and the low cost of the camera. The solution mainly includes two parts. The first part is to create a map having an image feature layer offline, and the second part is to use the created map to position the moving entity online.

In the context of the present disclosure, the term "moving entity" is any entity that is capable of moving, such as a person, vehicle or other device capable of moving. In an embodiment of the present disclosure, in order to be able to precisely position the moving entity, the moving entity may be provided with a camera capable of acquiring image data, such as a high precision camera, a panoramic camera, and a monocular camera.

In the context of the present disclosure, the term "acquisition entity" is an entity capable of acquiring point cloud data, image data, location data, and/or other suitable data. The acquisition entity may be a specific moving entity, such as a vehicle, person, or other device capable of moving. The acquisition entity may be provided with a camera, a position sensor and/or laser radar, the moving entity may be provided with a camera and a position sensor, and the moving entity may not be provided with the laser radar. The camera may be a high precision camera, a panoramic camera, a monocular camera, and the like. The position sensor may be a GPS device, an A-GPS (Assisted GPS) device, a span-cpt, or the like. The laser radar may be a single-line laser radar, a multi-line laser radar, a 3D laser radar, and the like.

The vehicles may include autonomous driving vehicles and/or non-automatic driving vehicles and the like. Autonomous driving vehicles are also referred to as driverless vehicles, that is, vehicles that may perform automated driving operations in part or in whole. Non-autonomous vehicles are vehicles that are completely commanded by driving instructions given by human.

In an embodiment of the present disclosure, it can be understood by those skilled in the art that the acquisition entity and the moving entity are interrelated. For example, if the acquisition entity is moving while acquiring data, then the acquisition entity may be considered as the moving entity in this case. On the other hand, when the moving entity is positioned, if the moving entity acquires an image to perform positioning based on the image, then the moving entity may be considered as an acquisition entity in this case.

In the process of creating a map, images acquired by the camera and location information acquired by the position sensor are used to generate a global feature layer of the map, and the images acquired by the camera and point clouds acquired by the laser radar are used to generate a local feature layer of the map. In the global feature layer, rough location information is associated with a global feature of the image; and in the local feature layer, precise three-dimensional coordinate information is associated with a local feature of the image. Thus, the rough location information is associated with the precise three-dimensional information through the global feature and the local feature of the image.

In the process of positioning the moving entity, based on the created map having the global feature layer and the local feature layer, an image acquired when the moving entity is moving and a rough location where the moving entity is located when the image is acquired are used to determine three-dimensional coordinate information associated with the image, to more precisely determine the location of the moving entity based on the three-dimensional coordinate information. Based on the high precision map created in advance, the moving entity only provided with a camera for acquiring images and a position sensor (for example, a GPS device) for acquiring a rough location, can obtain real-time three-dimensional information without using a laser radar.

In the following description, for convenience of description, the various embodiments of the present disclosure are described by taking a vehicle as an example. However, it should be understood by those skilled in the art that the solution of the present disclosure may also be similarly applied to acquisition entities and/or moving entities of other types.

Embodiments of the present disclosure will be specifically described below with reference to the accompanying drawings.

FIG. 1 illustrates a schematic diagram of an exemplary environment 100 in which various embodiments of the present disclosure may be implemented. In the exemplary environment 100, a map 110 having an image feature layer is created by a computing device 120. To create the map 110, the computing device 120 first acquires image data, location data, point cloud data, and the like. A position sensor, laser radar, and a camera that have been synchronized are installed on an acquisition entity (e.g., a vehicle 140). During the data acquisition phase, the camera captures an image while the vehicle 140 is moving, the position sensor acquires the location where the vehicle 140 is located when the image is acquired, and the laser radar acquires point cloud data associated with the image, the point cloud data indicating three-dimensional information of the image. A storage apparatus 130 may store and associate the images acquired when the vehicle 140 is moving, the locations where the vehicle 140 is located when the images are acquired, and the point cloud data associated with the images, etc. In some embodiments, the storage apparatus 130 may also store the map 110.

In some embodiments of the present disclosure, since the frequencies of the camera, position sensor, and laser radar may be different, the location acquired by the position sensor may not correspond to the location where the vehicle 140 is located when the image is acquired, and the point cloud data acquired by the laser radar may not correspond to the image. To this end, operations such as interpolation of the acquired images, locations, and point clouds may be performed such that the acquired image, the location, and the point cloud correspond to each other, and the corresponding images, locations, and point clouds are stored and associated in the storage apparatus 130.

Figure 2:
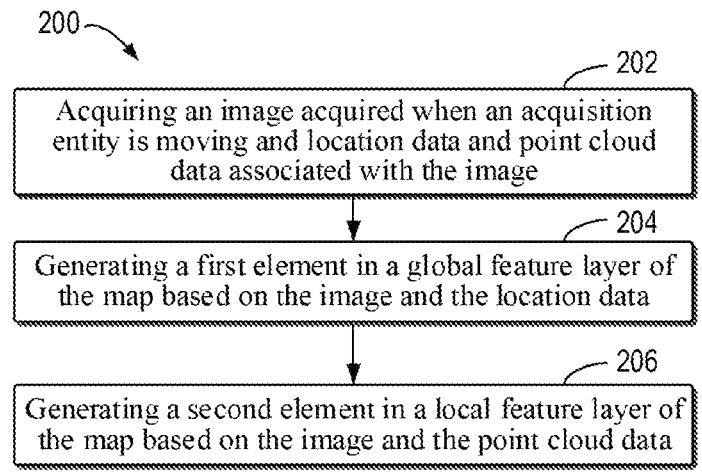
FIG. 2 illustrates a flowchart of a method for creating a map according to an embodiment of the present disclosure.

The computing device 120 acquires from the storage apparatus 130 the images acquired when the vehicle 140 is moving, the location data indicating the locations where the vehicle 140 is located when the images are acquired, and the point cloud data indicating the three-dimensional information of the images. The computing device 120 generates a global feature layer of the map based on the images and the location data. The computing device 120 also generates a local feature layer of the map based on the images and the point cloud data. Each acquired image has a corresponding global element in the global feature layer, and each acquired image has a corresponding local element in the local feature layer, and the global element and local element of a given image correspond to each other. FIG. 2 specifically shows how to generate a global element in the global feature layer and a local element in the local feature layer, which will be described in detail later.

Figure 3:
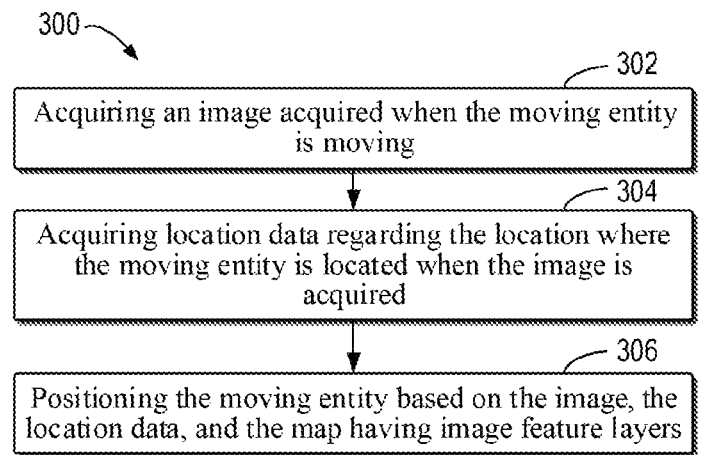
FIG. 3 illustrates a flowchart of a method for positioning a moving entity according to an embodiment of the present disclosure.

In the exemplary environment 100, the moving entity (e.g., a vehicle 150) is positioned by a computing device 160. A camera (such as a low-cost monocular camera) and a position sensor (such as a GPS device) are installed in the vehicle 150. The computing device 160 acquires an image acquired by the camera when the vehicle 150 is moving and location data acquired by the position sensor when the image is acquired. The computing device 160 positions vehicle 150 based on the acquired image, the location data, and the map 110 created by the computing device 120. FIG. 3 specifically illustrates how the computing device 160 positions the vehicle 150, which will be described in detail later.

It should be understood by those skilled in the art that although FIG. 1 shows that the vehicle 140 and the vehicle 150 are different vehicles, the vehicle 140 and the vehicle 150 may be a given vehicle, i.e., a given vehicle may be used to create a map and to perform positioning using the created map. Moreover, the computing device 160 and the computing device 120 are shown as different components, they may be a given component, i.e., both map creation and vehicle positioning are performed by a given computing device. It should also be understood that although the computing device 160 is shown as being separated from the vehicle 150, the computing device 160 may alternatively be located in the vehicle 150.

In addition, it should be understood that the numbers, structures, connections, and layouts of the components shown in FIG. 1 are exemplary, not limiting, and some of the components are optional. Those skilled in the art may make adjustments in terms of number, structure, connection, layout, etc. within the scope of the present disclosure.

The generation process of global elements in the global feature layer and local elements in the local feature layer is specifically described below with reference to FIG. 2. FIG. 2 illustrates a flowchart of a method 200 for creating a map according to an embodiment of the present disclosure. The method 200 may be performed, for example, by the computing device 120 in FIG. 1.

At block 202, the computing device 120 acquires an image acquired by the acquisition entity when the acquisition entity (e.g., the vehicle 140) is moving, location data associated with the image, and point cloud data associated with the image. The location data indicates the location where the vehicle 140 is located when the image is acquired, and the point cloud data indicates three-dimensional information of the image, for example, three-dimensional coordinates of an object in the image in the real world.

In some embodiments of the present disclosure, a camera is arranged in association with the vehicle 140, such as installed at the top, side, front window, rear window of the vehicle 140, or the camera may be a camera or other device with camera functions (e.g., mobile phone, tablet, etc.) carried by the driver or passenger of the vehicle 140. In addition, the position sensor (e.g., GPS device) and the laser radar are both set to synchronize with the camera. In some embodiments, the computing device 120 may acquire captured images from the camera, acquire location data of the vehicle 140 from the GPS device, and acquire point cloud data from the laser radar, the captured images, the location data and the point cloud data being synchronously acquired.

At block 204, the computing device 120 generates a first element, i.e., a global element, in the global feature layer based on the acquired image and location data. In some embodiments, the computing device 120 extracts a global feature of the acquired image. The global feature of the image represents the overall attribute of the image, such as color, texture, shape, and spatial envelope. In some embodiments of the present disclosure, the extracted global feature is the spatial envelope of the image. To facilitate subsequent calculations, the computing device 120 may represent the extracted global feature as a descriptor (e.g., a vector of a certain dimension), which may also be referred to as a global feature descriptor. The computing device 120 associates the global feature extracted from the image with the location where the vehicle 140 is located when the image is acquired to generate a global element in the global feature layer of the map. For example, the global element may be in the form of {global feature descriptor, location}.

At block 206, the computing device 120 generates a second element, i.e., a local element, in the local feature layer based on the acquired image and point cloud data. In some embodiments, the computing device 120 extracts a plurality of local features of the image, such as N local features. The local feature represents the attribute of a local area of the image (e.g., an area around a pixel in the image), such as edge, corner point, line, and curve. Likewise, to facilitate subsequent calculations, the computing device 120 may represent each of the extracted plurality of local features as a descriptor, which may also be referred to as a local feature descriptor.

In some embodiments, the computing device 120 extracts three-dimensional information corresponding to each local feature of the image from the point cloud data. For example, if a local feature reflects the attribute of a local area around a pixel (x, y) in the image, the computing device 120 extracts spatial three-dimensional coordinates corresponding to the pixel (x, y) from the point cloud data. The computing device 120 associates each extracted local feature with the three-dimensional information corresponding to the local feature to generate a local element in the local feature layer of the map. For example, the local element may be in the form of {(local feature descriptor 1, three-dimensional information 1); (local feature descriptor 2, three-dimensional information 2) . . . (local feature descriptor N, three-dimensional information N)} Since the local feature layer contains the three-dimensional information acquired by the laser radar, the created map is more precise.

Thus, for an image, the global element in the global feature layer may be generated using rough position information, and a local element in the local feature layer may be generated using the point cloud data. The global element and the local element generated from a given image correspond to each other.

Repeating the method 200 illustrated in FIG. 2 for each image stored in the storage apparatus 130, or for additional images subsequently acquired for updating the map, may continuously enrich the global feature layer and the local feature layer of the map 110. The created map may be stored on a cloud server side.

In the created map 110, in the global feature layer, the global feature of the image is associated with the rough position information, and in the local feature layer, the local feature of the image is associated with fine three-dimensional information. Thus, the global feature and local feature of the image are used as a bridge to associate the rough location information with the fine three-dimensional information. With such a map, high precision positioning may be performed on vehicles without installing laser radars.

How to position a moving entity such as a vehicle using the map created according to an embodiment of the present disclosure is described below in conjunction with FIG. 3. FIG. 3 illustrates a flowchart of a method 300 for positioning a moving entity according to an embodiment of the present disclosure. The method 300 may be performed by the computing device 160 as shown in FIG. 1.

At block 302, the computing device 160 acquires an image acquired when a moving entity (e.g., the vehicle 150) is moving. In some embodiments of the present disclosure, the computing device 160 may acquire images from a camera in the vehicle 150.

At block 304, the computing device 160 acquires location data regarding the location where the vehicle 150 is located when the image is acquired. For example, the computing device 160 may acquire the location data from a GPS device in the vehicle 150. In some embodiments of the present disclosure, the camera is arranged in association with the vehicle 150, such as installed at the top, side, front window, or rear window of the vehicle 150, or the camera may be a camera or other device with camera functions (e.g., mobile phone, tablet, etc.) carried by the driver or passenger of the vehicle 150. In addition, the GPS device is set to be synchronized with the camera.

Figure 4:
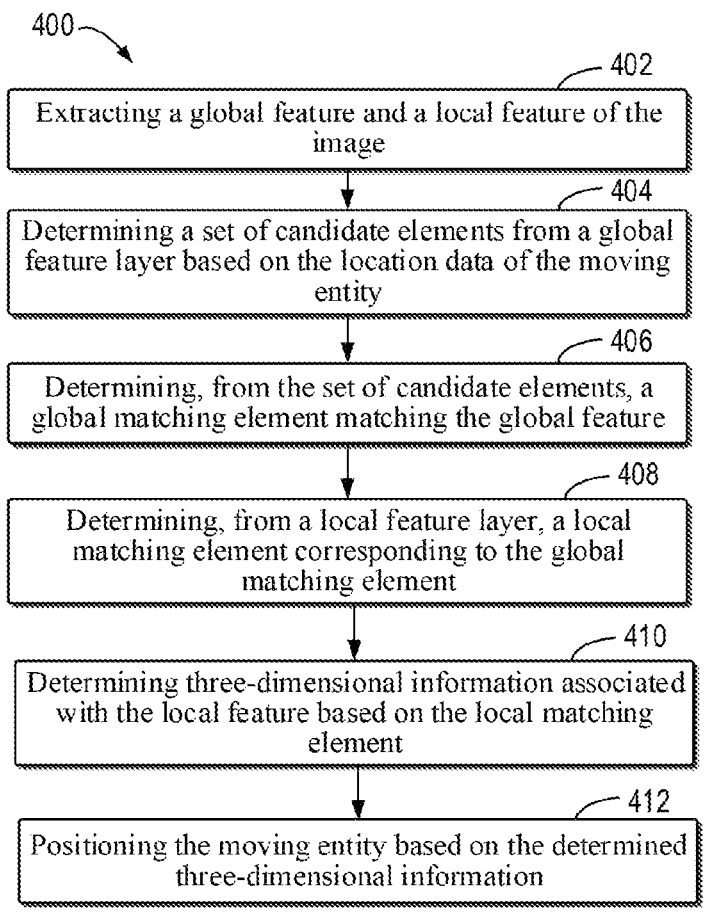
FIG. 4 illustrates a flowchart of a method for positioning a moving entity according to an embodiment of the present disclosure.

At block 306, the computing device 160 positions the vehicle 150 based on the acquired image, location data, and the map having image feature layers according to an embodiment of the present disclosure. Using the map having the global feature layer and the local feature layer according to an embodiment of the present disclosure, high precision positioning may be achieved by installing a low-cost camera and a GPS device on the vehicle 150 without installing an expensive laser radar. FIG. 4 further illustrates a more detailed process of positioning a vehicle based on an image, location data, and a map having image feature layers, which will be described in detail later.

Alternatively, to save computing resources, the computing device 160 may first acquire one or more planned paths from the vehicle 150 and then download a portion of an map associated with the planned path from the cloud service. In this way, the computing device 160 does not need to use the entire map, but only needs to use a part of the map, thereby saving the cost and increasing processing efficiency and speed.

FIG. 4 illustrates a method 400 for positioning a moving entity according to some embodiments of the present disclosure. The moving entity positioning process is described in detail below in conjunction with FIG. 4. The method 400 may be performed by the computing device 160 as shown in FIG. 1.

At block 402, the computing device 160 extracts the global feature and local feature of the image. As described above, the global feature represents the overall attribute of the image, such as the spatial envelope of the image. The local feature represents the attribute of a local area of the image (i.e., a part of the image). In some embodiments of the present disclosure, the computing device 160 uses a global feature descriptor to represent the extracted global feature and local feature descriptor to represent the extracted local feature. In some embodiments of the present disclosure, there are multiple extracted local features, such as local features 1'-N'.

At block 404, the computing device 160 determines a set of candidate elements from the global feature layer based on the location data. In some embodiments of the present disclosure, the computing device 160 selects a global element as described below from the global feature layer as a candidate element in the set of candidate elements: the distance from a location associated with the global element to the location indicated by the location data is within a predetermined threshold. The predetermined threshold is, for example, 100 meters, 200 meters, or the like.

At block 406, the computing device 160 determines, from the set of candidate elements, a global matching element matching the global feature extracted from the image. In some embodiments of the present disclosure, the computing device 160 compares the extracted global feature with the global feature of each candidate element in the set of candidate elements, and determines the global matching feature matching the global feature from the set of candidate elements based on the comparison.

At block 408, the computing device 160 determines a local matching element corresponding to the global matching element from the local feature layer. As described above, the local matching element corresponding to the global matching element may include N entries, each of which has a local feature and corresponding three-dimensional information, for example, the form may be {(local feature descriptor 1, three-dimensional information 1); (local feature descriptor 2, three-dimensional information 2) . . . (local feature descriptor N, three-dimensional information N)}.

At block 410, the computing device 160 determines three-dimensional information associated with the local feature extracted from the image based on the local matching element. Specifically, for each local feature i' ($1'<=i'<=N'$) of the plurality of local features extracted from the image, the computing device 160 compares the local feature i' with each of the N local features in the local matching element to determine the local matching feature matching the local feature i' in the local matching element. The three-dimensional information associated with the local matching feature is acquired as the three-dimensional information associated with the local feature i'.

At block 412, the computing device 160 positions the moving entity based on the determined three-dimensional information. In some embodiments of the present disclosure, the moving entity is positioned based on the determined three-dimensional information, such as by solving a camera pose by a PnP (perspective-n-point) algorithm.

Since the map associates the rough position with the fine three-dimensional coordinates through the global feature and the local feature, the vehicle 150 may achieve high precision positioning of the vehicle 150 by only installing a camera (e.g., a monocular camera) and a position sensor (e.g., a GPS) in the actual positioning, without installing an expensive high accuracy laser radar.

Figure 5:
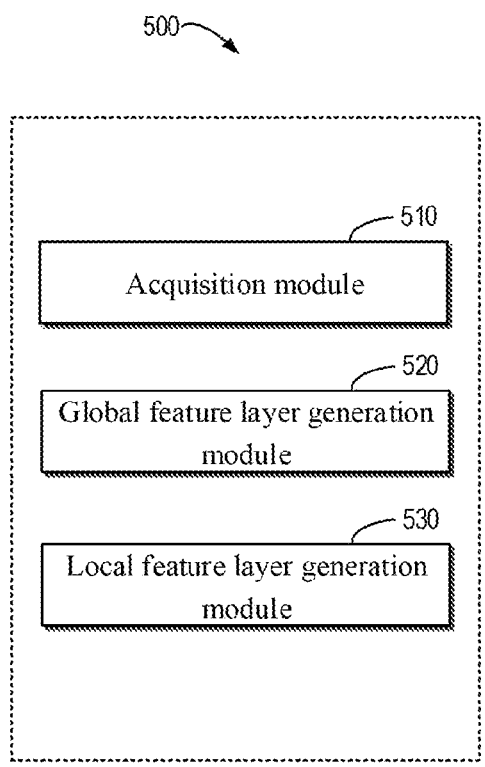
FIG. 5 illustrates a block diagram of an apparatus for creating a map according to an embodiment of the present disclosure.

FIG. 5 illustrates a block diagram of an apparatus 500 for creating a map according to an embodiment of the present disclosure. The apparatus 500 includes: an acquisition module 510, configured to acquire an image acquired when an acquisition entity is moving and location data and point cloud data associated with the image, the location data indicating a location where the acquisition entity is located when the image is acquired, and the point cloud data indicating three-dimensional information of the image; a global feature layer generation module 520, configured to generate a first element in a global feature layer of the map based on the image and the location data; and a local feature layer generation module 530, configured to generate a second element in a local feature layer of the map based on the image and the point cloud data, the first element corresponding to the second element.

In some embodiments of the present embodiment, the acquisition module 510 includes: an image acquisition module, configured to acquire the image acquired by a camera arranged in association with the acquisition entity; a location acquisition module, configured to acquire the location data of the acquisition entity, the location data being acquired by a position sensor synchronously with acquiring the image by the camera; and a point cloud acquisition module, configured to acquire the point cloud data, the point cloud data being acquired by a laser radar synchronously with acquiring the image by the camera.

In some embodiments of the present embodiment, the global feature layer generation module 520 includes: a global feature extraction module, configured to extract a global feature of the image, the global feature representing an overall attribute of the image; and an association module, configured to associate the location data with the global feature to generate the first element in the global feature layer.

In some embodiments of the present embodiment, the local feature layer generation module 530 includes: a local feature extraction module, configured to extract a local feature of the image, the local feature representing an attribute related to apart of the image; a three-dimensional information extraction module, configured to extract three-dimensional information associated with the local feature from the point cloud data; and an association module, configured to associate the local feature with the three-dimensional information to generate the second element in the local feature layer.

Figure 6:
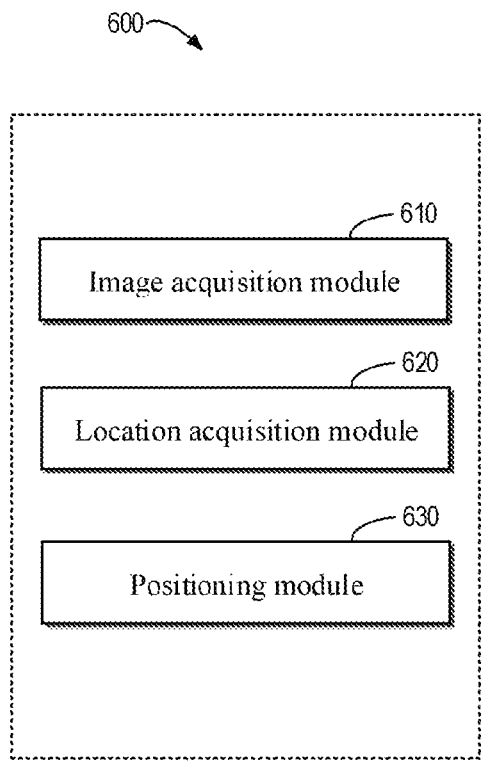
FIG. 6 illustrates a block diagram of an apparatus for positioning a moving entity according to an embodiment of the present disclosure.

FIG. 6 illustrates a block diagram of an apparatus 600 for positioning a moving entity according to an embodiment of the present disclosure. As shown in FIG. 6, the apparatus 600 includes: an image acquisition module 610, configured to acquire an image acquired when the moving entity is moving; a location acquisition module 620, configured to acquire location data regarding the location where the moving entity is located when the image is acquired; and a positioning module 630, configured to position the moving entity based on the image, the location data, and the map according to an embodiment of the present disclosure.

In some embodiments of the present embodiment, the positioning module 630 includes: a feature extraction module, configured to extract a global feature and a local feature of the image, the global feature representing an overall attribute of the image, and the local feature representing an attribute related to a part of the image; a candidate element determination module, configured to determine a set of candidate elements from a global feature layer of the map based on the location data of the moving entity; a global matching element determination module, configured to determine, from the set of candidate elements, a global matching element matching the global feature; a local matching element determination module, configured to determine, from a local feature layer of the map, a local matching element corresponding to the global matching element; a three-dimensional information determination module, configured to determine three-dimensional information associated with the local feature based on the local matching element; and a positioning determination module, configured to position the moving entity based on the three-dimensional information.

In some embodiments of the present embodiment, the apparatus 600 further includes: a planned path acquisition module, configured to acquire a planned path of the moving entity; and a map downloading module, configured to download a portion of the map associated with the planned path.

In some embodiments of the present embodiment, the image acquisition module 610 is further configured to: acquire the image acquired by a camera arranged in association with the moving entity. The location acquisition module 620 is further configured to: acquire the location data of the acquisition entity, the location data being acquired by a position sensor in synchronization with acquiring the image by the camera.

Figure 7:
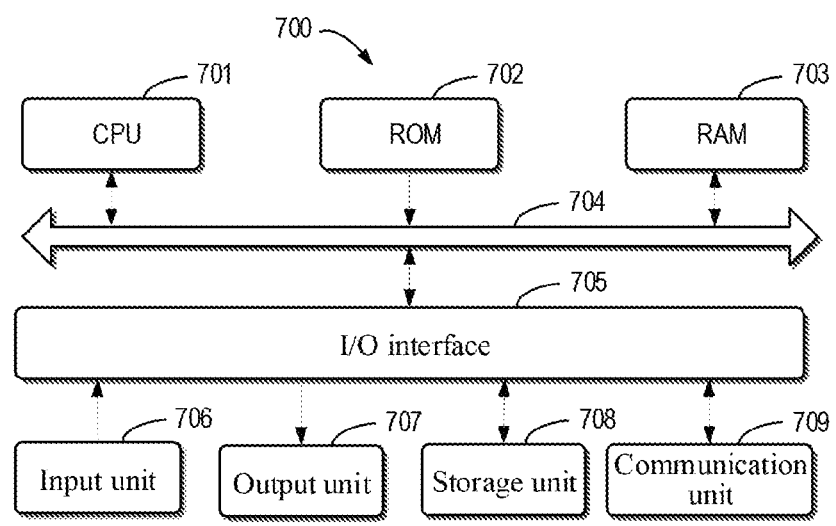
FIG. 7 illustrates a block diagram of a computing device that may be used to implement the embodiments of the present disclosure.

FIG. 7 shows a schematic block diagram of an exemplary device 700 capable of implementing various embodiments of the present disclosure. The device 700 may be used to implement the computing device 120 and the computing device 160 of FIG. 1. As shown in the figure, the device 700 includes a central processing unit (CPU) 701 that may perform various appropriate actions and processing in accordance with computer program instructions stored in a read only memory (ROM) 702 or computer program instructions loaded into a random access memory (RAM) 703 from a storage unit 708. In the RAM 703, various programs and data required for the operation of the device 700 may also be stored. The CPU 701, the ROM 702, and the RAM 703 are connected to each other through a bus 704. An input/output (I/O) interface 705 is also coupled to the bus 704.

A plurality of components in the device 700 are coupled to the I/O interface 705, including: an input unit 706, such as a keyboard or a mouse; an output unit 707, such as various types of displays, or speakers; the storage unit 708, such as a disk or an optical disk; and a communication unit 709 such as a network card, a modem, or a wireless communication transceiver. The communication unit 709 allows the device 700 to exchange information/data with other devices over a computer network such as the Internet and/or various telecommunication networks.

The processing unit 701 performs the various methods and processes described above, such as the process 200, process 300 and/or the process 400. For example, in some embodiments, process 200, process 300 and/or the process 400 may be implemented as a computer software program that is tangibly embodied in a machine readable medium, such as the storage unit 708. In some embodiments, some or all of the computer programs may be loaded and/or installed onto the device 700 via the ROM 702 and/or the communication unit 709. When a computer program is loaded into the RAM 703 and executed by the CPU 701, one or more of the actions or steps of the process 200, process 300 and/or the process 400 described above may be performed. Alternatively, in other embodiments, the CPU 701 may be configured to perform the process 200, process 300 and/or the process 400 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for creating a map, the method comprising:
   acquiring an image acquired when an acquisition entity is moving and location data and point cloud data associated with the image, the location data indicating a location where the acquisition entity is located when the image is acquired, and the point cloud data indicating three-dimensional information of the image;
   extracting a global feature of the image, the global feature representing an overall attribute of the image and comprising a spatial envelope of the image; and associating the location data with the global feature to generate a first element in a global feature layer of the map; and
   extracting a local feature of the image, the local feature representing an attribute related to an area around a pixel in the image; extracting three-dimensional information associated with the local feature from the point cloud data; and associating the local feature with the three-dimensional information to generate a second element in a local feature layer of the map, the first element corresponding to the second element.

2. The method according to claim 1, wherein the acquiring the image, the location data and the point cloud data comprises:
   acquiring the image acquired by a camera arranged in association with the acquisition entity;
   acquiring the location data of the acquisition entity, the location data being acquired by a position sensor in synchronization with acquiring the image by the camera; and
   acquiring the point cloud data, the point cloud data being acquired by a laser radar in synchronization with acquiring the image by the camera.

3. The method according to claim 1, the method comprising:
   acquiring a second image acquired when an moving entity is moving;

acquiring second location data regarding a location where the moving entity is located when the second image is acquired; and positioning the moving entity based on the second image, the second location data, and the map.

4. The method according to claim 3, wherein the positioning the moving entity comprises:

extracting a global feature and a local feature of the second image, the global feature representing an overall attribute of the second image, the local feature representing an attribute related to a part of the second image;

determining a set of candidate elements from the global feature layer of the map based on the second location data of the moving entity;

determining, from the set of candidate elements, a global matching element matching the global feature;

determining, from a local feature layer of the map, a local matching element corresponding to the global matching element;

determining three-dimensional information associated with the local feature based on the local matching element; and positioning the moving entity based on the three-dimensional information.

5. The method according to claim 3, further comprising:
acquiring a planned path of the moving entity; and
downloading a portion of the map associated with the planned path.

6. The method according to claim 3, wherein the acquiring the second image comprises:
acquiring the second image acquired by a camera arranged in association with the moving entity.

7. The method according to claim 6, wherein the acquiring second location data of the moving entity comprises:
acquiring the second location data of the acquisition entity, the second location data being acquired by a position sensor in synchronization with acquiring the image by the camera.

8. An apparatus for creating a map, the apparatus comprising:
at least one processor; and
a memory storing instructions, wherein the instructions when executed by the at least one processor, cause the at least one processor to perform operations, the operations comprising:
acquiring an image acquired when an acquisition entity is moving and location data and point cloud data associated with the image, the location data indicating a location where the acquisition entity is located when the image is acquired, and the point cloud data indicating three-dimensional information of the image;
extracting a global feature of the image, the global feature representing an overall attribute of the image and comprising a spatial envelope of the image; and associating the location data with the global feature to generate a first element in a global feature layer of the map; and
extracting a local feature of the image, the local feature representing an attribute related to an area around a pixel in the image; extracting three-dimensional information associated with the local feature from the point cloud data; and associating the local feature with the three-dimensional information to generate a second element in a local feature layer of the map, the first element corresponding to the second element.

9. The apparatus according to claim 8, wherein the acquiring the image, the location data and the point cloud data comprises:
acquiring the image acquired by a camera arranged in association with the acquisition entity;
acquiring the location data of the acquisition entity, the location data being acquired by a position sensor in synchronization with acquiring the image by the camera; and
acquiring the point cloud data, the point cloud data being acquired by a laser radar in synchronization with acquiring the image by the camera.

10. The apparatus according to claim 8, wherein the operations comprise:
acquiring a second image acquired when an moving entity is moving;
acquiring second location data regarding a location where the moving entity is located when the second image is acquired; and
positioning the moving entity based on the second image, the second location data, and the map.

11. The apparatus according to claim 10, wherein the positioning the moving entity comprises:
extracting a global feature and a local feature of the second image, the global feature representing an overall attribute of the second image, the local feature representing an attribute related to a part of the second image;
determining a set of candidate elements from the global feature layer of the map based on the second location data of the moving entity;
determining, from the set of candidate elements, a global matching element matching the global feature;
determining, from a local feature layer of the map, a local matching element corresponding to the global matching element;
determining three-dimensional information associated with the local feature based on the local matching element; and
positioning the moving entity based on the three-dimensional information.

12. The apparatus according to claim 10, wherein the operations further comprise:
acquiring a planned path of the moving entity; and
downloading a portion of the map associated with the planned path.

13. The apparatus according to claim 10, wherein the acquiring the second image comprises:
acquiring the second image acquired by a camera arranged in association with the moving entity.

14. The apparatus according to claim 13, wherein the acquiring second location data of the moving entity comprises:
acquiring the second location data of the acquisition entity, the second location data being acquired by a position sensor in synchronization with acquiring the image by the camera.

15. A non-transitory computer storage medium, storing a computer program thereon, the computer program, when executed by a processor, cause the processor to perform operations, the operations comprising:
acquiring an image acquired when an acquisition entity is moving and location data and point cloud data associated with the image, the location data indicating a location where the acquisition entity is located when the image is acquired, and the point cloud data indicating three-dimensional information of the image;

extracting a global feature of the image, the global feature representing an overall attribute of the image and comprising a spatial envelope of the image; and associating the location data with the global feature to generate a first element in a global feature layer of the map; and extracting a local feature of the image, the local feature representing an attribute related to an area around a pixel in the image; extracting three-dimensional information associated with the local feature from the point cloud data; and associating the local feature with the three-dimensional information to generate a second element in a local feature layer of the map, the first element corresponding to the second element.

16. The non-transitory computer storage medium, wherein the operations comprise:

acquiring a second image acquired when an moving entity is moving;

acquiring second location data regarding a location where the moving entity is located when the second image is acquired; and positioning the moving entity based on the second image, the second location data, and the map.

* * * * *